UNITED STATES PATENT OFFICE.

OSCAR GÜNTHER, OF OPLADEN, NEAR COLOGNE, GERMANY, ASSIGNOR TO SYNTHETIC PATENTS CO., INC., OF NEW YORK, N. Y., A CORPORATION OF NEW YORK.

AZO DYE.

1,159,375.   Specification of Letters Patent.   Patented Nov. 9, 1915.

No Drawing.   Application filed October 6, 1914.   Serial No. 865,299.

*To all whom it may concern:*

Be it known that I, OSCAR GÜNTHER, doctor of philosophy, chemist, citizen of the German Empire, residing at Opladen, near Cologne, Germany, have invented new and useful Improvements in Azo Dye, of which the following is a specification.

I have found that new and valuable dyestuffs can be obtained by combining in an alkaline solution with diazotized ortho-aminophenol compounds such monoazo dyes, as are obtained by combining a diazotized anthranilic acid compound with a 2-amino-5-naphthol-7-sulfonic acid compound in such a manner that the diazo compound enters into the nucleus containing the amino group. The new dyestuffs are after being dried and pulverized dark powders yielding upon reduction with stannous chlorid and hydrochloric acid an ortho-aminophenol compound, an anthranilic acid compound and a diamino derivative of a 2-amino-5-naphthol-7-sulfonic acid compound. They dye wool in red to violet-black shades, which by an after treatment with chromium compounds are changed into from bluish-black to greenish-black shades very fast to light, alkalis, acids, milling and potting.

In order to illustrate the new process more fully the following example is given, the parts being by weight: 431 parts of the dyestuff obtained by coupling in acid solution diazotized anthranilic acid and 2-amino-5-naphthol-7-sulfonic acid, so that the azo group is in the nucleus containing the amino group, are combined at a temperature of about 5° C. and in the presence of an excess of soda with the diazo compound prepared from 154 parts of 4-nitro-2-amino-phenol; after the combination is complete, the mixture is heated to 70° C. and the dyestuff is separated by salting out. The dye is collected on a filter and dried. It is a dark powder soluble in water with a red-violet, in concentrated sulfuric acid with a blue-violet coloration; yielding upon reduction with stannous chlorid and hydrochloric acid anthranilic acid, 2.4-diamino-1-phenol and 1.2.6-triamino-5-naphthol-7-sulfonic acid. It has in a free state most probably the formula:

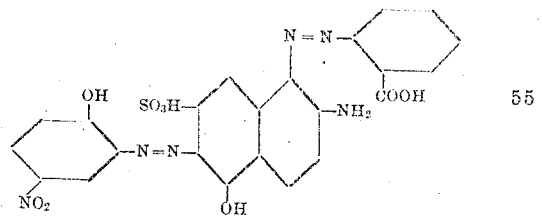

and yields on wool in an acid bath Bordeaux-red shades which on being chromed, change into a greenish-black, very fast to alkali, acids, light, milling and potting.

Instead of anthranilic acid itself another anthranilic acid compound can be used, such as chloroanthranilic acid, nitroanthranilic acid, etc.; instead of the nitroaminophenol mentioned in the example other orthoaminophenol compounds, such as picramic acid, 4-chloro-2-aminophenol, its sulfonic acids, such as 2-amino-1-phenol-4-sulfonic acid, 2.3-aminonaphthol-6-sulfonic acid, etc., and instead of the 2.5-aminonaphthol-7-sulfonic acid its alkyl- and aryl-derivatives, such as phenyl-2.5-aminonaphthol-7-sulfonic acid, may be used.

I claim:—

1. The new coloring matters being derived from a diazotized anthranilic acid compound, a diazotized ortho-aminophenol compound and a 2-amino-5-naphthol-7-sulfonic acid compound, which are after being dried and pulverized dark powders; yielding upon reduction with stannous chlorid and hydrochloric acid an ortho-aminophenol compound, an anthranilic acid compound and a diamino derivative of a 2-amino-5-naphthol-7-sulfonic acid compound; dyeing wool in red to violet-black shades which by an after treatment with chromium compounds change into bluish-black to greenish-black shades fast to light, alkalis, acids, milling and potting, substantially as described.

2. The new coloring matters being derived from diazotized anthranilic acid, a diazotized ortho-aminophenol compound and a 2-amino-5-naphthol-7-sulfonic acid compound, which are after being dried and pulverized dark powders; yielding upon reduction with stannous chlorid and hydrochloric acid an ortho-amino-phenol compound, anthranilic acid and a diamino derivative of a 2-amino-5-naphthol-7-sulfonic acid compound; dyeing wool in red to violet-black shades which by an after treatment with chromium compounds change into bluish-black to greenish-black shades fast to light, alkalis, acids, milling and potting, substantially as described.

3. The new coloring matters being derived from diazotized anthranilic acid, a diazotized nitro-ortho-aminophenol compound and a 2-amino-5-naphthol-7-sulfonic acid compound, which are after being dried and pulverized dark powders; yielding upon reduction with stannous chlorid and hydrochloric acid an amino ortho-amino-phenol compound, anthranilic acid and a diamino derivative of a 2-amino-5-naphthol-7-sulfonic acid compound; dyeing wool in red to violet-black shades which by an after treatment with chromium compounds change into bluish-black to greenish-black shades fast to light, alkalis, acids, milling and potting, substantially as described.

4. The herein described new coloring matter having in a free state most probably the formula:

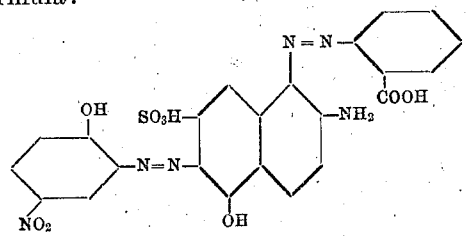

which is after being dried and pulverized a dark powder soluble in water with a red-violet and in concentrated sulfuric acid with a blue-violet coloration; yielding upon reduction with stannous chlorid and hydrochloric acid anthranilic acid, 2.4-diamino-1-phenol and 1.2.6-triamino-5-naphthol-7-sulfonic acid; yielding on wool in acid baths Bordeaux-red shades, which on being chromed change into greenish-black very fast to alkali, acids, light, milling and potting, substantially as described.

In testimony whereof I have hereunto set my hand in the presence of two subscribing witnesses.

OSCAR GÜNTHER.

Witnesses:
J. D. ZIESECKE,
LEE SCHVENTHAL.